United States Patent [19]
Hiruma

[11] 3,917,295
[45] Nov. 4, 1975

[54] FLUID OPERATED VEHICLE BODY LEVEL CONTROL SYSTEM

[75] Inventor: Mituo Hiruma, Kodaira, Japan

[73] Assignee: Nissan Motor Company Limited, Yokohama, Japan

[22] Filed: June 28, 1974

[21] Appl. No.: 484,239

[30] Foreign Application Priority Data
June 30, 1973 Japan............................ 48-73854
July 4, 1973 Japan............................ 48-74686

[52] U.S. Cl. ........................... 280/6 H; 280/124 F
[51] Int. Cl.² ............................................. B60G 11/26
[58] Field of Search .............. 280/124 F, 6 H, 6.1

[56] References Cited
UNITED STATES PATENTS
| | | | |
|---|---|---|---|
| 2,229,530 | 1/1941 | South | 280/6 H |
| 2,684,254 | 7/1954 | Goss | 280/6 H |
| 3,002,765 | 10/1961 | MacDuff | 280/124 F |

*Primary Examiner*—Philip Goodman

[57] ABSTRACT

Sensing valve and switch means impart a fluid lock on the vehicle body leveling adjustors when the roll and/or pitch of the vehicle body exceeds a certain level to prevent delayed and erroneous compensation by the leveling system. A manual switch has a position to extend the adjustors to full length to allow underbody repairs without a supplementary jack.

18 Claims, 4 Drawing Figures

FLUID OPERATED VEHICLE BODY LEVEL CONTROL SYSTEM

The present invention relates to a fluid operated motor vehicle body leveling system including novel means for preventing delayed and erroneous compensation by the system when the roll and/or pitch of the vehicle body exceeds a certain level, and means for selectively using the system to jack up or lower the vehicle body.

It is well known in the prior art to provide a hydropneumatic leveling system for a body of a motor vehicle to maintain the vehicle body level with respect to the road surface or equivalently to the vehicle wheels by employing hydraulic adjustors in mechanical series with air springs at selected locations between the vehicle axles and the vehicle body. Each adjustor is commicable with a hydraulic pump and a fluid reservoir through a leveling valve, which is controlled to supply fluid into the respective adjustor from the source or to drain fluid from the respective adjustor into the reservoir to raise or lower the vehicle body respectively at the location of the adjustor in response to a sensed lack of parallelism between the vehicle body and the road surface. Several, usually four, adjustors acting in combination maintain the vehicle body level, and the air springs serve as shock absorbers.

However, a problem remains in that there is a time delay in the system between sensing of a tilt condition of the vehicle body and compensation by the system. This problem is most evident in cases in which the vehicle undergoes radical acceleration or deceleration or makes a sharp turn at relatively high speed. If the vehicle undergoes, for example, radical deceleration as during braking from high speed, the vehcile body will be pitched forward with the vehicle body rear being lifted up in relation to the front. The opposite occurs during acceleration.

In the case of the vehicle making sharp turns in alternating directions, during each turn, the vehicle body, without the provision of the leveling system, will roll away from the turn with the side of the vehicle body closest to the center of the turn higher from the road surface than the side farthest from the center of the turn. The leveling system compensates by supplying fluid under pressure into the adjustors on the side of the vehicle body farthest from the center of the turn to raise the same, and drains fluid from the adjustors on the side of the vehicle body closest to the center of the turn to lower the same to restore parallelism between the vehicle body and the road surface. However, due to the delay in system operation, compensation will occur after the vehicle has started the turn and continues for a period after the vehicle has finished the turn, resulting in an unnatural and unpleasant sensation to the vehicle occupants. In the worst possible case, the system can be extremely dangerous if the delay in the system is equal to the rate at which the vehicle is making alternating turns. In this case, compensation for a turn in one direction will occur while the vehicle is making another turn in the opposite direction, with the result that the roll angle of the vehicle during the second turn is twice what it would be without the leveling system. The roll angle would progressively increase so that during the following turn it would be four times that without the provision of the leveling system. As a result, a side of the vehicle body would eventually strike the road surface, and could cause a serious accident.

It is also convenient to provide when stopping the leveling system with means to selectively constantly pump pressurized fluid into the adjustors to jack up the vehicle body and allow underbody repairs and changing tires without a supplementary jack.

It is therefore and important object of the present invention to provide a fluid operated leveling system for a body of a motor vehicle including means to ensure safety of the vehicle occupants by limiting the compensation of the leveling system.

It is a further object of the present invention to provide a fluid operated leveling system for a body of a motor vehicle which minimizes the effects of time delay in the leveling system.

It is a further object of the present invention to provide a novel and useful fluid operated leveling system for a body of a motor vehicle which is simiple in construction, inexpensive to manufacture, and can be easily adapted to a variety of motor vehicle bodies with practically no modification to the bodies.

It is a still further object of the present invention to provide a fluid operated leveling system for a vehicle body including means for selectively jacking up the vehicle body when stopped to allow underbody repairs.

The above and other objects, features and advantages of the present invention will become more aparent from the following detailed description taken in conjunction with the accompanying drawings, in which:

Figure 1:
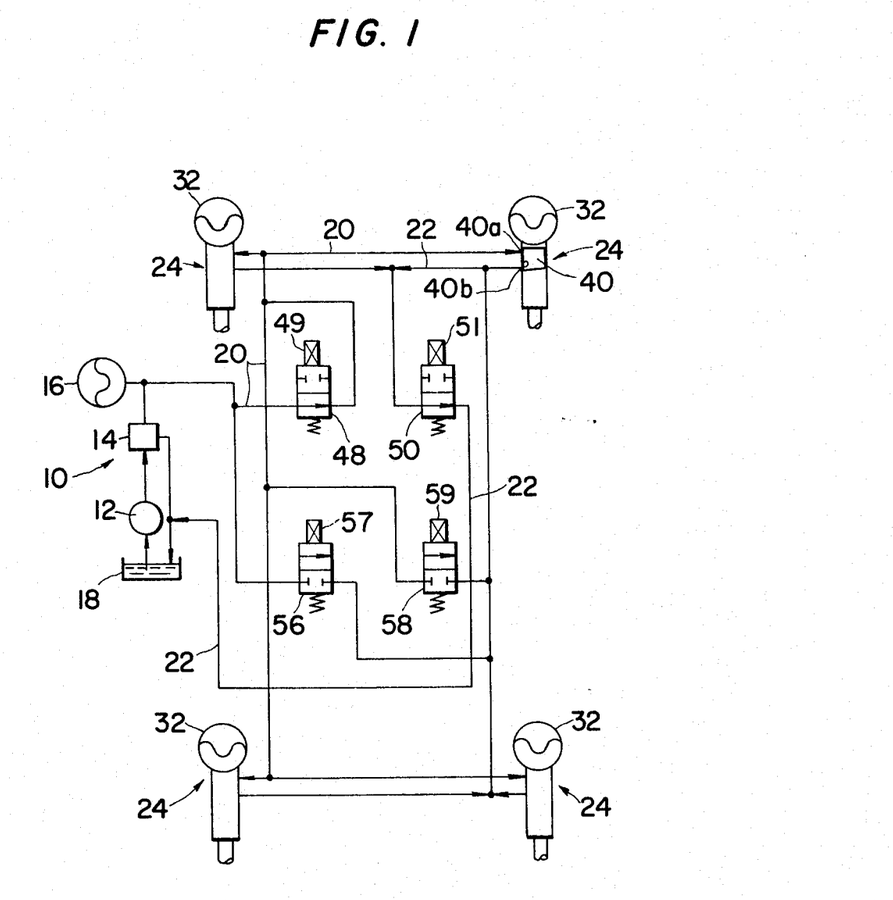
FIG. 1 is a schematic diagram of a first embodiment of a leveling system for a body of a motor vehicle according to the present invention.

Referring now to FIG. 1, a leveling system for a vehicle body embodying the present invention includes a source 10 of hydraulic fluid under pressure having a pump 12, a pressure control or bypass valve 14, and an accumulator 16. The pump 12 receives fluid from a reservoir 18, with which the bypass valve 14 also communicates. The source 10 and reservoir 18 communicate through a pressure line 20 and a drain line 22 respectively with four adjustors 24, one for each wheel of the vehicle in this example. Each adjustor 24 includes a hydraulic cylinder 26 (see FIG. 3) in which a piston 28 is slidable. The cylinder 26 is attached to a structural member of the vehicle body 30 through an air spring 32 which acts as a shock absorber. A piston rod 34 extends from the piston 28 and is pivotally connected to an axle 36 carried by a wheel 38. Each adjustor 24 also includes a leveling valve 40 to control communication between the interior of the cylinder 26 and the pressure and drain lines 20 and 22 through an inlet 40a and an outlet 40b respectively. The leveling valves 40 are responsive to the orientation of the vehicle body 30 relative to the road surface or the plane substantially defined by the wheels 38, and connect the interiors of the respective cylinders 26 to the pressure line 20 or the drain line 22 to raise or lower the vehicle body 30 at respective portions as required to restore and maintain parallelism between the vehicle body 30 and the road surface.

The leveling system of FIG. 1 includes a sensor 42 (see FIG. 2), which is mounted on the vehicle body 30 in a vertical position and is operative to sense the roll and/or pitch of the vehicle body 30 and feed an electrical tilt signal to a delay unit 44 when the sensed level of the roll and/or pitch is above a predetermined level or in response to a sensed lack of parallelism between the vehicle body and the road surface exceeding a predetermined degree. The exemplary sensor 42 shown is a pendulum switch having a contact or pendulum 52 connected to an electrical power source such as a 12V DC car battery (not shown), and a fixed contact 54 connected to the delay unit 44. The pendulum 52 engages with the contact 54 when the car body 30 is tilted beyond a predetermined angle in any direction, and stops 56 are provided to limit the movement of the pendulum 52 relative to the car body 30. The electrical tilt signal is generated upon engagement of the pendulum 52 with the contact 54 and fed to the delay unit 44. After a suitable delay period, an electrical signal is generated by a control unit 46 responsive to the output of the delay circuit 44 and fed to switch means (no numeral) which control solenoid valves which will be described below to control communication through the pressure and drain lines 20 and 22 between the source 10 and the reservoir 18 respectively and the adjustors 24.

Figure 2:
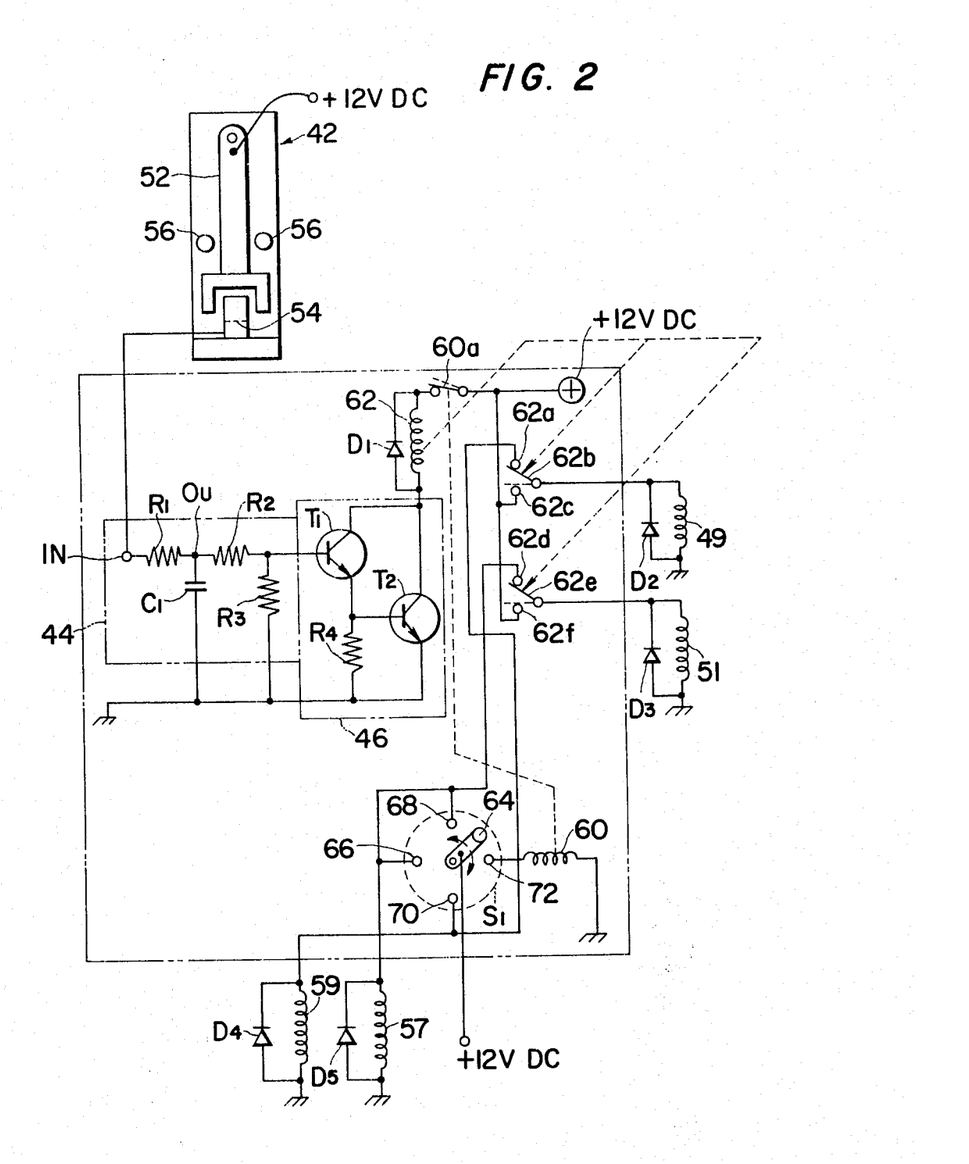
FIG. 2 is an electrical schematic diagram of the leveling system shown in FIG. 1.

It will be understood that the sensor 42 as shown is capable of sensing only the roll or pitch of the vehicle body 30. However, two orthogonally arranged sensors 42 electrically connected in parallel can detect roll and/or pitch greater than predetermined degrees. Any other known sensor may be employed in place of the sensor 42 as shown which is also capable to sense the yaw of the vehicle body 30.

The solenoid valve means of the first embodiment of the invention illustrated in FIGS. 1 and 2 include first, second, third and fourth solenoid valves 48, 50, 56 and 58 controlled by coils 49, 51, 57 snd 59 respectively. The solenoid valve 48 is normally open and is disposed in the pressure line 20 between the source 10 and the inlets 40a of the leveling valves 40. The solenoid valve 50 is also normally open and is disposed in the drain line 22 between the reservoir 18 and the outlets 40b of the leveling valves 40. The solenoid valve 56 is normally closed and is disposed between the source 10 and the outlets 40b of the leveling valves 40. The solenoid valve 58 is also normally closed and is disposed between the reservoir 18 and the inlets 40a of the leveling valves 40.

The output of the sensor 42 is connected to an input terminal. In of the delay unit 44, the input being grounded through an integrating circuit consisting of a resistor $R_1$ and a capacitor $C_1$. The junction Ou between the resistor $R_1$ and the capacitor $C_1$, constituting the output of the integrating circuit and also of the delay circuit 44 is connected to ground through a voltage divider consisting of resistors $R_2$ and $R_3$. The junction between the resistors $R_2$ and $R_3$ is connected to the base of an NPN transistor $T_1$, the emitter of which is grounded through a resistor $R_4$. The junction between the emitter of the transistor $T_1$ and the resistor $R_4$ is connected to the base of an NPN transistor $T_2$, the emitter of which is grounded directly. The collectors of both transistors $T_1$ and $T_2$ are connected to a contact of a contact assembly 60a actuated by a relay coil 60 through a parallel combination of a relay coil 62 and a diode $D_1$. The other contact of the contact assembly 60a is connected to the 12V DC battery (not shown). The transistor $T_1$ acts as a level detector to sense the level of the output ou of the integrating circuit of the delay unit 44, and the transistor $T_2$ acts as a switching-driving transistor for the relay coil 62. The relay coils 60 and 62 and their contacts and a switch $S_1$ constitute the switch means. The relay coils 62 actuates two sets of contacts, one set constituted by contacts 62a, 62b and 62c and the other set by contacts 62d, 62e and 62f. The two contact sets are actuated simultaneously by the relay coil 62.

The contact 62b is movable and is connected to ground through the parallel combination of the solenoid coil 49 and a diode $D_2$. The contact 62c is fixed and is connected to the battery. The contact 62a is also fixed and is connected to a body level lowering contact 70 of the switch $s_1$. The contact 62e is movable and is connected to ground through the parallel combination of the solenoid coil 51 and a diode $D_3$. The contact 62f is fixed and is connected to the battery. The contact 62d is also fixed and is connected to a body jacking contact 68 of the switch $S_1$. When the relay coil 62 is de-energized, the respective contacts are in the positions shown in solid lines, with the contacts 62a and 62b engaged and the contacts 62d and 62e engaged. When the relay coil 62 is energized, the respective contacts are moved to the positions shown in broken lines, with the contacts 62b and 62c and the contacts 62e and 62f engaged.

A cut-out contact 72 of the switch $S_1$ is connected to ground through the relay coil 60. When the relay coil 60 is de-energized, the contact assembly 60a is closed as shown in solid line, and when the relay coil 60 is energized, the contact assembly 60a is opened as shown in broken line.

The contact 68 of the switch $S_1$ is also connected to ground through the parallel combination of the solenoid coil 57 and a diode $D_5$. The contact 70 of the switch $S_1$ is also connected to ground through the parallel combination of the solenoid coil 59 and a diode $D_4$. A normal contact 66 is also provided in the switch $S_1$. A contact arm 64 of the switch $S_1$ is connected to the battery and is manually rotatable to engage any one of the contacts 66, 68, 70 and 72.

The operation of the leveling system of FIGS. 1 and 2 will now be described.

Under normal conditions, the operator of the vehicle will rotate the arm 64 to engage the normal contact 66 of the switch $S_1$. Both relay coils 60 and 62 will be de-energized so that the contact assembly 60a is closed and the collector of the transistor $T_2$ is connected to the battery through the parallel combination of the relay coil 62 and the diode $D_1$. However, since the vehicle body 30 is not tilted beyond the predetermined degree, and the sensor 42 does not produce the tilt signal, the output of the integrating circuit is zero and the base potential of the transistor $T_1$ is also 0. The arrangement of the transistors $T_1$ and $T_2$ is such that the transistor $T_1$ is biased to be non-conductive by the zero base potential. The cutoff point of the transistor $T_1$ is below a selected positive voltage. Since the transistor $T_1$ is connected at its emitter to the base of the transistor $T_2$, the transistor $T_2$ will be non-conductive as long as the transistor $T_1$ is non-conductive or cutoff. Thus, the current flow through the relay coil 62 will be substantially 0, and the relay coil 62 will be de-energized.

As a result, the contacts 62a and 62b and the contacts 62d and 62e are engaged. Since the potential at the contacts 62a and 62d is zero, the solenoid coils 49 and 51 will be de-energized and the solenoid valves 48 and 50 will be open. Similarly, the solenoid coils 57 and 59 will be de-energized and the solenoid valves 56 and 58 will be closed. In this state, the leveling system will operate normally as if the solenoid valves 48, 50, 56 and 58 were not in operation, since the inlets 40a of the leveling valves 40 are connected to the source 10 through the solenoid valve 48 and the outlets 40b of the leveling valves 40 are connected to the reservoir 18 through the solenoid valve 50.

If, however, the tilt, or the roll and/or pitch of the vehicle body 30 exceeds the predetermined degree, the pedulum 52 of the sensor 42 engages the contact 54 and +12V DC (the tilt signal) is applied to the terminal In of the delay unit 44. The capacitor $C_1$ will then begin to charge through the resistor $R_1$ to integrate the tilt signal with respect to a function of time determined by the time constants of the resistor $R_1$ and capacitor $C_1$. A proportion of the integrated output will be fed to the base of the transistor $T_1$ through the voltage divider constituted by the resistors $R_2$ and $R_3$. When the base potential of the transistor $T_1$ exceeds the cutoff point, the transistor $T_1$ will conduct thereby causing the transistor $T_2$ to conduct. As a result, current (the electrical signal) will flow though the relay coil 62 to energize the same. The relay contacts 62b and 62c and the contacts 62e and 62f will then engage. As a result, the solenoid coils 49 and 51 will be connected to the battery to be energized thereby. In this state, the solenoid valves 48 and 50 will be closed, and the solenoid valves 56 and 58 will remain closed. Communication between the inlets 40a of the leveling valves 40 and the source 10 will thereby be blocked by the solenoid valve 48, and similarly communication between the outlets 40b of the leveling valves 40 will be blocked by the solenoid valve 50. A fluid lock will thereby be imparted on the adjustors 24 to prevent movement of the same, and delayed and/or erroneous compensation by the leveling system for the excessive tilt condition will be prevented. The air springs 32 will, however, continue to serve as shock absorbers.

When the excessive tilt condition of the vehicle body 30 has ended, generation of the tilt signal by the sensor 42 will cease and the capacitor $C_1$ will start to discharge through the resistors $R_2$ and $R_3$. When the base potential of the transistor $T_1$ drops below the cutoff point, the transistor $T_1$ and thereby the transistor $T_2$ will become non-conductive, and the relay coil 62 will become de-energized. The solenoid coils 49 and 51 will then be de-energized, and the solenoid valves 48 and 50 will open to provide the normal operation described above.

In order to use the leveling system to raise or jack-up the vehicle body 30 for the purpose of changing a tire or underbody repairs, the vehicle operator rotates the arm 64 to contact the jacking contact 68 of the switch $S_1$. In this case, since the relay coil 62 is de-energized, the contacts 62a and 62b and the contacts 62d and 62e are engaged. Since +12V DC is applied to the jacking contact 68 through the arm 64, the solenoid coil 57 is energized directly and the solenoid coil 51 is energized through the contacts 62d and 62e. It will be noticed that the solenoid coils 49 and 59 are not energized, since the potential at the contact 70 of the switch $S_1$ is 0. The solenoid valves 48 and 56 are thus open, and the solenoid valves 50 and 58 are closed. The inlets 40a of the leveling valves 40 are thereby connected to the source 10 through the solenoid valve 48, and the outlets 40b of the leveling valves 40 are also connected to the source 10 through the solenoid valve 56. Communication between the inlets 40a of the leveling valves 40 and the reservoir 18 is blocked by the solenoid valve 58, and communication between the outlets 40b of the leveling valves 40 and the reservoir 18 is blocked by the solenoid valve 50. Therefore, pressurized fluid from the source 10 is introduced into the cylinders 26 of the adjustors 24 irrespective of whether the inlet 40a or outlet 40b is connected to the cylinder 26 by the operation of the respective leveling valve 40, since both the inlets 40a and outlets 40b of the leveling valves 40 are connected to the source 10. The adjustors 24 will thus be extended to their maximum length, and the vehicle body 30 will be jacked-up.

Underbody repairs are facilitated in this condition without the need of a supplementary jack. If a vehicle tire is to be changed, all that is required is to support the corner of the vehicle body 30 from which the tire is removed by means of, for example, any convenient object such as a rock, box or brick.

It is also possible to lower the vehicle body 30 by rotating the arm 64 to engage with the lowering contact 70. This operation is similar to that of jacking-up except that the solenoid coils 49 and 59 are energized and the solenoid coils 51 and 57 are not energized. The solenoid valves 50 and 58 are thereby open, and the solenoid valves 48 and 56 are closed. The inlets 40a are connected to the reservoir 18 through the solenoid valve 58, and the outlets 40b are connected to the reservoir 18 through the solenoid valve 50. Communication between the inlets 40a and the source 10 is blocked by the solenoid valve 48, and communication between the outlets 40b and the source 10 is blocked by the solenoid valve 56. Thus, the fluid in all cylinders 26 of the adjustors 24 will be drained into the reservoir 18, and the vehicle body 30 will drop to its minimum height above the road surface.

In case of a malfunction or failure of the sensor 42, delay unit 44, control unit 46 or switch means, the vehicle operator may rotate the arm 64 to engage the cut-out contact 72, which will result in energization of the relay coil 60 and opening of the contact assembly 60a. In this case, it becomes impossible to energize the relay coil 62 since communication with the battery through the contact assembly 60a is prevented, and the solenoid valves 48 and 50 will be open and the solenoid valves 56 and 58 will be closed under all tilt conditions of the vehicle body 30. The operation of the leveling system will thus be controlled by the leveling valves 40 only.

Figure 3:
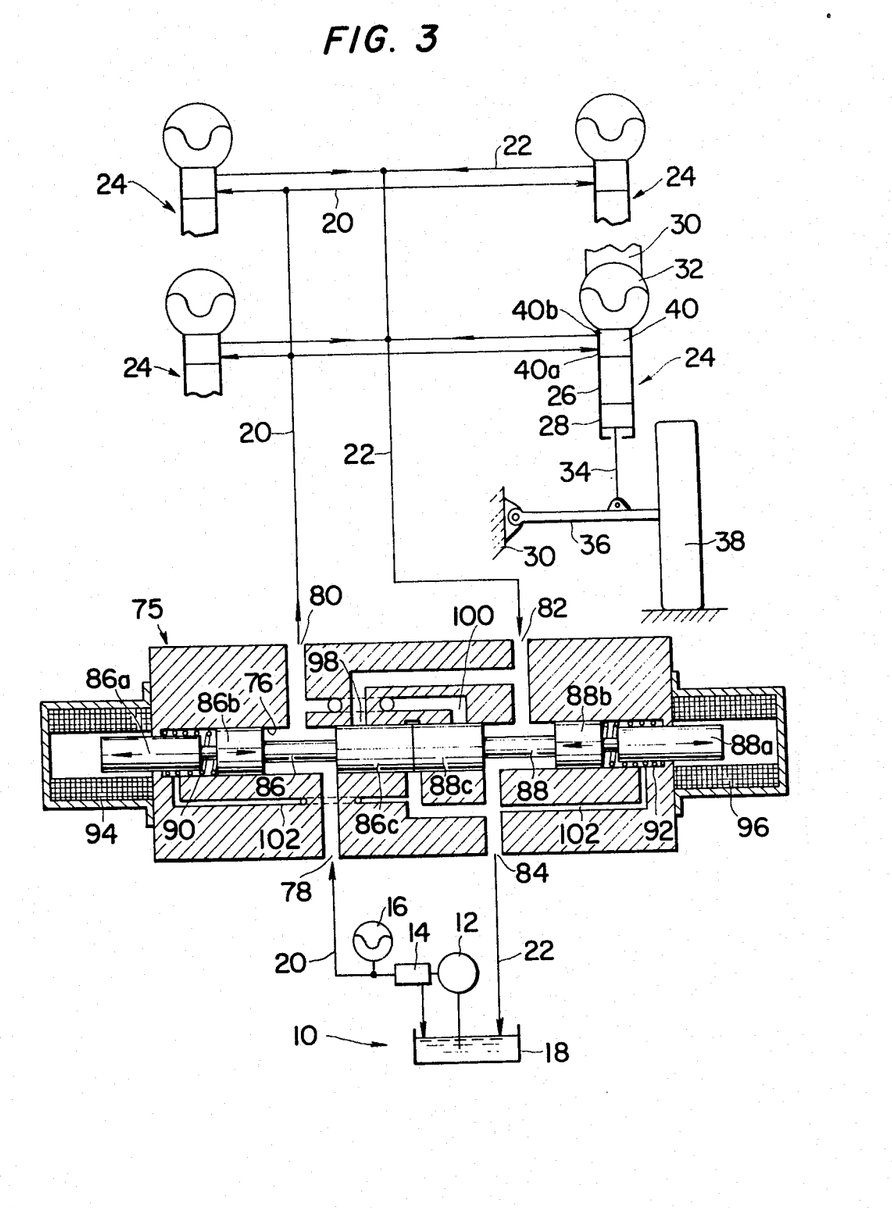
FIG. 3 is a schematic diagram of a second embodiment of a leveling system according to the present invention.
Figure 4:
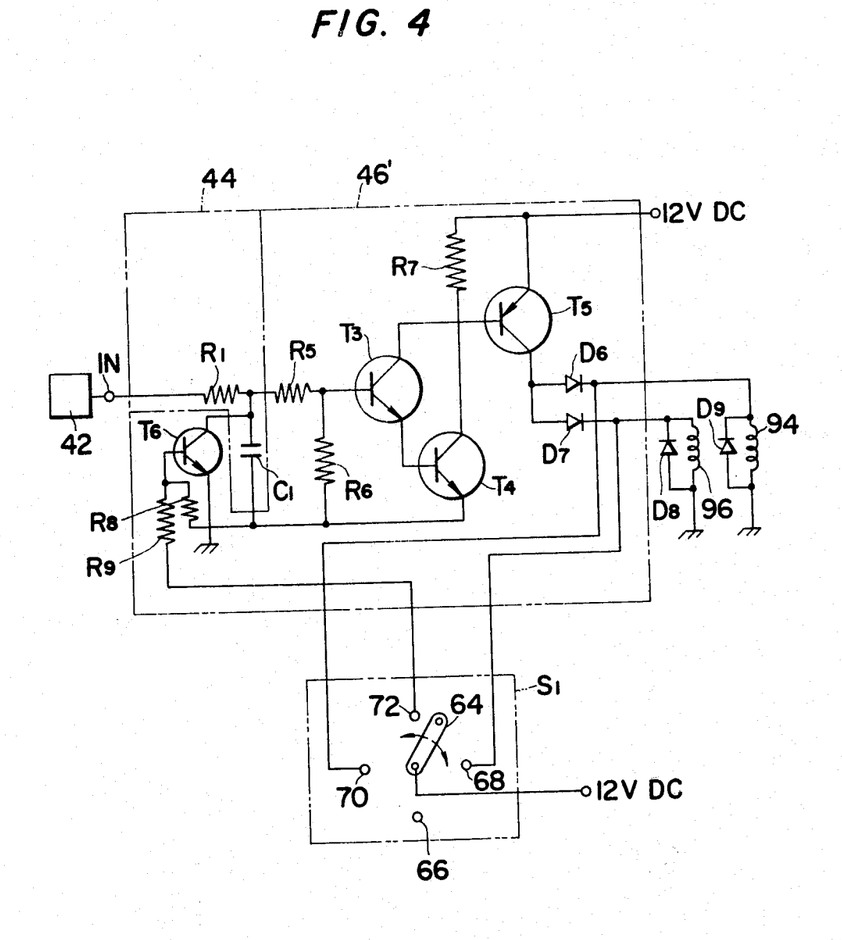
FIG. 4 is an electrical schematic diagram of the leveling system shown in FIG. 3.

A second embodiment of the present invention is shown in FIGS. 3 and 4, and produces exactly the same effects as the embodiment of FIGS. 1 and 2. Since the source 10, adjustors 24 and leveling valves 40, sensor 42, delay circuit 44 and switch $S_1$ are exactly the same as in the embodiment of FIGS. 1 and 2, a detailed description thereof will be omitted to avoid useless repetition.

Referring now to FIG. 3, the solenoid valves 48, 50, 56 and 58 of FIG. 1 have been replaced by a single solenoid valve 75, which has a bore or chamber 76. The solenoid valve 75 has a first inlet 78 connected to the source 10, a first outlet 80 connected to the inlets 40a of the leveling valves 40, a second inlet 82 connected to the outlets 40b of the leveling valves 40 and a second outlet 84 connected to the reservoir 18. First and second valve spools or elements 86 and 88 slidable in the bore 76 are biased to the right and the left by compression springs 90 and 92 respectively to a central or balanced position as shown in FIG. 3. The valve element 86 has lands 86a, 86b and 86c, and the valve element 88 has lands 88a, 88b and 88c. Solenoid coils 94 and 96 are arranged to electromagnetically engage with, when energized, the lands 86a and 88a to move the valve elements 86 and 88 to the left and right respectively as shown in FIG. 3 away from the central position. A first passageway 98 leads from the second inlet 82 to the chamber 76, and a second passageway 100 leads from the first inlet 80 to a portion of the chamber 76 symmetrically rightward of the first passageway 98. The valve land 86c is arranged to allow or block flow through the first inlet 78, first outlet 80 and first passageway 98, and the valve land 88c is arranged to allow or block flow through the second inlet 82, second outlet 84 and the second passageway 100 as will be described in detail below. A drain passageway 102 is also provided to drail oil leaking between the valve lands and the bore to the reservoir 18.

Referring now to FIG. 4, a modified control unit 46' includes a resistor $R_5$ having one end connected to the junction between the resistor $R_1$ and capacitor $C_1$ of the delay unit 44 and the other end connected to ground through a resistor $R_6$. The junction between the resistors $R_5$ and $R_6$, which constitute a voltage divider, is connected to the base of an NPN transistor $T_3$. The emitter of the transistor $T_3$ is connected to the base of an NPN transistor $T_4$, and the collector of the transistor $T_3$ is connected to the base of a PNP transistor $T_5$. The emitter of the transistor $T_5$ is connected directly to the +12V DC battery, and the collector of the transistor $T_4$ is connected to the battery through a resistor $R_7$. The emitter of the transistor $T_4$ is grounded, and the collector of the transistor $T_5$ is connected to the anodes of diodes $D_6$ and $D_7$. The cathode of the diode $D_6$ is connected to the body lowering contact 70 of the switch $S_1$ and also to ground through a parallel combination of the solenoid coil 94 and a diode $D_9$. The cathode of the diode $D_7$ is connected to the jacking contact 68 of the switch $S_1$ and also to ground through the parallel combination of the solenoid coil 96 and a diode $D_8$.

The cut-out contact 72 of the switch $S_1$ is connected through a resistor $R_9$ to the base of an NPN transistor $T_6$, the base of which is also connected to ground through a resistor $R_8$. The emitter of the transistor $T_6$ is grounded and the collector thereof is connected to the junction between the resistor $R_1$ and the capacitor $C_1$ of the delay unit 44.

The operation of the embodiment of FIGS. 3 and 4 will now be described.

With the arm 64 engaged with the normal contact 66 of the switch $S_1$, under normal conditions, the outputs of the sensor 42 (the tilt signal) and also of the delay unit 44 are 0, and zero potential is applied to the base of the transistor $T_3$, which acts as a level detector as in the previous embodiment. It will be noticed that the base potential of the transistor $T_6$ is zero biasing the same into a nonconductive state, so that it has no effect on the delay unit 44. The transistors $T_4$ and $T_5$ are rendered non-conductive by the transistor $T_3$. The current flow through the transistor $T_5$ and the solenoid coils 94 and 96 is substantially zero, and the solenoid coils 94 and 96 are thus de-energized. The valve elements 86 and 88 are thereby moved to the central position by the springs 90 and 92 respectively. Communication is established between the first inlet 78 and the first outlet 80 and between the second inlet 82 and the second outlet 84, and the leveling system is under the control of the leveling valves 40 in the normal condition as in the first embodiment, since the inlets 40a of the leveling valves 40 communicate with the source 10 through and first outlet 80, chamber 76 and first inlet 78, and the outlets 40b of the leveling valves 40 communicate with the reservoir 18 through the second inlet 82, chamber 76 and second outlet 84. In this normal condition, communication between the first passageway 98 and the first inlet 78 is blocked by the land 86c of the first valve element 86, and communication between the second passageway 100 and the second outlet 84 is blocked by the land 88c of the valve element 88.

When an excessive tilt condition is detected by the sensor 42, the tilt signal is fed to the delay unit 44. When the integrated output of the delay unit 44 exceeds the cut-off point of the transistor $T_3$, the transistors $T_3$, $T_4$ and $T_5$ conduct, thereby energizing both solenoid coils 94 and 96. The valve elements 86 and 88 are moved to the left and right respectively as viewed in FIG. 3, and the valve land 86c blocks communication between the first inlet 78 and the first outlet 80. Similarly, the valve land 88c blocks communication between the second inlet 82 and the second outlet 84. Communication through the first and second passageways 98 and 100 is also blocked by the lands 86c and 88c respectively. The result is that a fluid lock is applied to the adjustors 24 as in the previous embodiment to prevent erroneous compensation by the leveling system.

When it is required to jack up the vehicle body 30, the arm 64 is rotated to engage with the jacking contact 68. This results in +12V DC being applied to the solenoid coil 96 to energize the same. The valve element 88 is moved by the solenoid coil 96 rightward and the valve element 86 is moved rightward past the central position by the spring 90. The first inlet 78 thereby communicates with the first outlet 80, and also with the second inlet 82 through the first passageway 98 which is opened by the land 86c. Communication between the second inlet 82 and the second outlet 84 and flow through the second passageway 100 is blocked by the land 88c. Both the inlets 40a and outlets 40b of the leveling valves 40 thus communicate with the source 10 and are blocked from communicating with the reservoir 18 as in the previous embodiment, and the vehicle body 30 is jacked-up.

To lower the vehicle body 30, the arm 64 is rotated to engage the body lowering contact 70, which energizes the solenoid coil 94. The valve element 86 is moved leftward by the solenoid coil 94 and the valve element 88 is moved leftward past the central position by the spring 92. The second outlet 84 thereby communicates with the second inlet 82 and also with the first outlet 80 through the second passageway 100 which is opened by the land 88. Communication between the first inlet 78 and the first outlet 80 and flow through the first passageway 98 is blocked by the land 86c. Thus, both the inlets 40a and outlets 40b of the leveling valves 40 are connected to the reservoir 40, and fluid is drained from the cylinders 26 to lower the vehicle body 30. The diodes $D_6$ and $D_7$ prevent reverse current flow through the transistor $T_5$.

When it is desired to de-activate the sensor 42, etc. due to a system malfunction, the arm 64 is rotated to engate with the cut-out contact 72. A potential is thereby applied to the transistor $T_6$ to render the same conductive, and collector current flow through the transistor $T_6$ will effectively short-circuit the output of the delay unit 44 to ground, and render the solenoid coils 94 and 96 deenergized at all times. The leveling system operation will thus be under the control of the leveling valves 40 only.

What is claimed is:

1. In a fluid operated levelling system for a vehicle body having a source of fluid under pressure and a fluid reservoir, adjustors operative to raise and lower the vehicle body and levelling valves communicable with the source and the reservoir through inlets and outlets thereof in response to the level orientation of the vehicle body in respect to the road surface and operative to communicate the adjustors with the source and the reservoir to maintain the vehicle body substantially parallel to the road surface, the improvement comprising:

first electrically controlled valve means connected between the source and the inlets of the levelling valves;

second electrically controlled valve means connected between the source and the inlets of the levelling valves;

second electrically controlled valve means connected between the reservoir and the outlets of the levelling valves;

third electrically controlled valve means connected between the source and the outlets of the levelling valves;

fourth electrically controlled vave means connected between the reservoir and the inlets of the levelling valves;

sensing means sensing planar orientation of the vehicle body relative to road surface orientation and operative to generate an electrical signal in response to lack of parallelism between the vehicle body and the road surface exceeding a predetermined degree being sensed; and switch means responsive to said electrical signal and being manually switchable between a normal position and a jacking position, said switch means being operative to control said electrically controlled valve means in such a manner that;

when said switch means are in said normal position, said electrically controlled valve means are controlled to normally connect the inlets of the levelling valves to the source and the outlets of the levelling valves to the reservoir, and in response to said electrical signal to block communication between the inlets of the levelling valves and the source and the outlets of the levelling valves and the reservoir; and when said switch means are in said jacking position, said electrically controlled valve means are controlled to connect both the inlets and outlets of the levelling valves to the source and block communication between the inlets and the outlets of the levelling valves and the reservoir.

2. In a fluid operated levelling system for a vehicle body having a source of fluid under pressure and a fluid reservoir adjustors operative to raise and lower the vehicle body and levelling valves communicable with the source and the reservoir through inlets and outlets thereof in response to the level orientation of the vehicle body in respect to the road surface and operative to communicate the adjustors with the source and the reservoir to maintain the vehicle body substantially parallel to the road surface, the improvement comprising:

first electrically controlled valve means connected between the source and the inlets of the levelling valves;

second electrically controlled valve means connected between the reservoir and the outlets of the levelling valves;

third electrically controlled valve means connected between the source and the outlets of the levelling valves;

fourth electrically controlled valve means connected between the reservoir and the inlets of the levelling valves;

sensing means sensing planar orientation of the vehicle body relative to road surface orientation and operative to generate an electrical signal in response to lack of parallelism between the vehicle body and the road surface exceeding a predetermined degree being sensed; and switch means responsive to said electrical signal and being manually switchable between a normal position and a jacking position, said switch means being operative to control said electrically controlled valve means in such a manner that;

when said switch means are in said normal position, said first and second electrically controlled valve means are open and said third and fourth electrically controlled valve means are closed, and said switch means respond to said electric signal to close said first and second electrically controlled valve means; and when said switch mens are in said jacking position, said first and third electrically controlled valve means are open and said second and fourth electrically controlled valve means are closed.

3. The improvement according to claim 2, in which each of said electrically controlled valve means comprises a solenoid valve.

4. The improvement according to claim 2, in which said sensing means include a sensor responsive to the orientation of the vehicle body and operative to generate an electrical tilt signal in response to said sensed lack of parallelism, and a control unit operative to feed said electrical signal to said switch means in response to said electrical tilt signal.

5. The improvement according to claim 4, in which said sensing means further includes a delay unit connected between said sensor and said control unit.

6. The improvement according to claim 5, in which said delay unit includes an integrating circuit operative to integrate said electrical tilt signal with respect to time, and said control unit includes a level detector responsive to the output of said delay unit, said control unit being operative to feed said electrical signal to said switch means when the integrated level of said electrical tilt signal is above a predetermined value.

7. The improvement according to claim 2, in which said sensing means includes a pendulum switch having a contact fixed to the vehicle body and another contact in the form of a pendulum engageable with said contact when the lack of parallelism between the vehicle body and a horizontal road surface exceeds a predetermined degree.

8. The improvement of claim 2, in which the fluid is in liquid form, and in which the source includes a pump, a pressure control valve and an accumulator.

9. The improvement of claim 2, in which the adjustors include shock absorbers.

10. The improvement of claim 2, in which said switch means are further switchable to a lowering position in which said electrically controlled valve means are controlled to connect both the inlets and outlets of the levelling valves to the reservoir and to block communication between the inlets and outlets of the levelling valves and the source.

11. The improvement of claim 2, in which said switch means are further switchable to a cut-out position in which said electrically controlled valve means are controlled to connect the inlets of the levelling valves to the source and the outlets of the levelling valves to the reservoir at all times.

12. The improvement of claim 2, in which when said switch means are in said cut-out position, said sensing means are inhibited thereby from generating said electrical signal.

13. The improvement of claim 2, in which said switch means are further switchable to a lowering position to control said first and third electrically controlled valve means to be closed and said second and fourth electrically controlled valve means to be open.

14. The improvement of claim 2, in which said switch means are further switchable to a cut-out position in which said first and second electrically controlled valve means are open and said third and fourth electrically controlled valve means are closed at all times.

15. In a fluid operated levelling system for a vehicle body having a source of fluid under pressure and a fluid reservoir, adjustors operative to raise and lower the vehicle body and levelling valves communicable with the source and the reservoir through inlets and outlets thereof in response to the level orientation of the vehicle body in respect to the road surface and operative to communicate the adjustors with the source and the reservoir to maintain the vehicle body substantially parallel to the road surface, the improvement cooprising;

electrically controlled valve means disposed between the source and the reservoir and the inlets and outlets of the levelling valves; said electrically controlled valve means including a solenoid valve having a casing defining therein a chamber communicable with a first inlet connected to the source, a first outlet connected to the inlets of the levelling valves, a second inlet connected to the outlets of the levelling valves and a second outlet connected to the reservoir, valve elements movable within said chamber to control communication between said inlets and outlets of said solenoid valve and said chamber, biasing means urging said valve elements to allow communication between said first inlet and said first outlet and between said second inlet and said second outlet through portions of said chamber, and solenoid coil means connected to said switch means which, when energized in response to said electrical signal, move said valve elements against the force of said biasing means to block communication between said first inlet and said first outlet and between said second inlet and said second outlet;

sensing means sensing planar orientation of the vehicle body relative to road surface orientation and operative to generate an electricl signal in response to lack of parallelism between the vehicle body and the road surface exceeding a predetermined degree being sensed; and switch means responsive to said electrical signal and being manually switchable between a normal position and a jacking position, said switch means being operative to control said valve means in such a manner that;

when said switch means are in said normal position, said valve means are controlled to normally connect the inlets of the levelling valves to the source and the outlets of the levelling valves to the reservoir, and in response to said electrical signal to block communication between the inlets of the levelling valves and the source and the outlets of the levelling valves and the reservoir; and when said switch means are in said jacking position, said valve means are controlled to connect both the inlets and outlets of the levelling valves to the source and block communication between the inlets and the outlets of the levelling valves and the reservoir.

16. The improvement of claim 15, in which said valve elements include a first valve element to control communication between said first inlet and said first outlet and a second valve element to control communication between said second inlet and said second outlet, and in which said solenoid coil means includes first and second solenoid coils connected to said switch means to control said first and second valve elements respectively.

17. The improvement of claim 16, in which said solenoid valve further includes a first passageway connected to said second inlet and communicable with said chamber, said first valve element being operative to control communication between said first passageway and said first inlet through said chamber in such a manner that said first valve element normally blocks communication between said first passageway and said first inlet when both of said first and second solenoid coils are de-energized when said switch means are in said normal position and when both of said first and second solenoid coils are energized in response to said electrical signal, and when said switch means are in said jacking position, only said second solenoid coil is energized thereby moving said second valve element to block communication between said second inlet and said second outlet and said first valve element is moved by said biasing means to allow communication of said first inlet with said first outlet and also with said second inlet through said first passageway.

18. The improvement of claim 17, in which said switch means are further switchable to a lowering position, and in which said solenoid valve further includes a second passageway connected to said first inlet and communicable with said chamber, said second valve element being operative to control communication between said second passageway and said second outlet through said chamber in such a manner that said second valve element blocks communication between said second passageway and said second outlet when both of said first and second solenoid coils are de-energized and when both of said first and second solenoid coils are energized, and when said switch means are in said lowering position, only said first solenoid coil is energized thereby moving said first valve element to block communication between said first inlet and said first outlet and said second valve element is moved by said biasing means to allow communication of said second outlet with said second inlet and also with said first inlet through said second passageway.

* * * * *